July 31, 1962 M. W. KUCHENBECKER 3,047,201

MULTI-COMPARTMENT TRAY

Filed Dec. 9, 1960 9 Sheets-Sheet 1

July 31, 1962 M. W. KUCHENBECKER 3,047,201

MULTI-COMPARTMENT TRAY

Filed Dec. 9, 1960 9 Sheets-Sheet 2

July 31, 1962 M. W. KUCHENBECKER 3,047,201

MULTI-COMPARTMENT TRAY

Filed Dec. 9, 1960 9 Sheets-Sheet 3

July 31, 1962 M. W. KUCHENBECKER 3,047,201

MULTI-COMPARTMENT TRAY

Filed Dec. 9, 1960 9 Sheets-Sheet 7

July 31, 1962 M. W. KUCHENBECKER 3,047,201

MULTI-COMPARTMENT TRAY

Filed Dec. 9, 1960 9 Sheets-Sheet 8

July 31, 1962 M. W. KUCHENBECKER 3,047,201

MULTI-COMPARTMENT TRAY

Filed Dec. 9, 1960 9 Sheets-Sheet 9

3,047,201
MULTI-COMPARTMENT TRAY

Morris W. Kuchenbecker, Neenah, Wis., assignor to American Can Company, Jersey City, N.J., a corporation of New Jersey Filed Dec. 9, 1960, Ser. No. 74,807
1 Claim. (Cl. 229—28)

This invention relates to a multi-compartment tray. More specifically, the invention relates to a tray which can be shipped in flat collapsed condition to the user and which can be readily set up for use.

Figure 1:
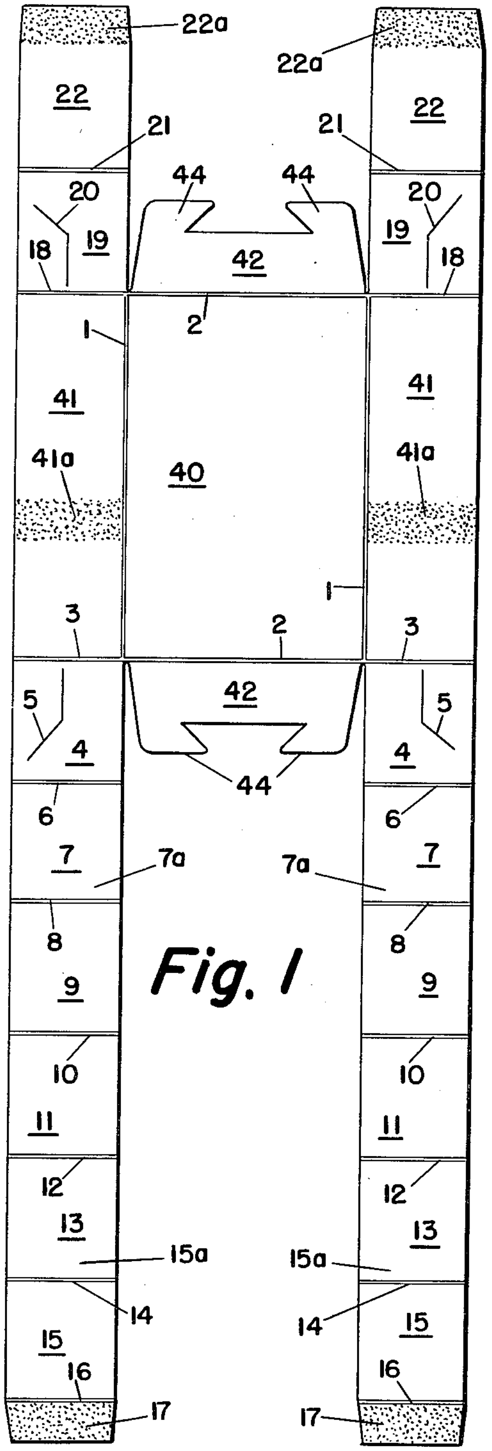
Figure 2:
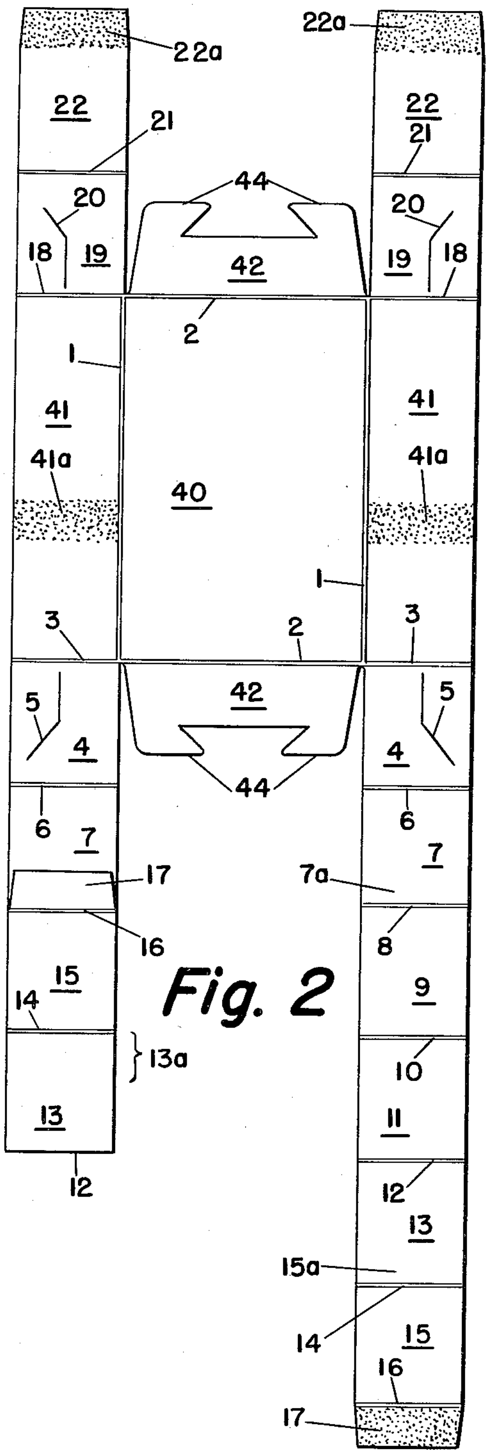
Figure 3:
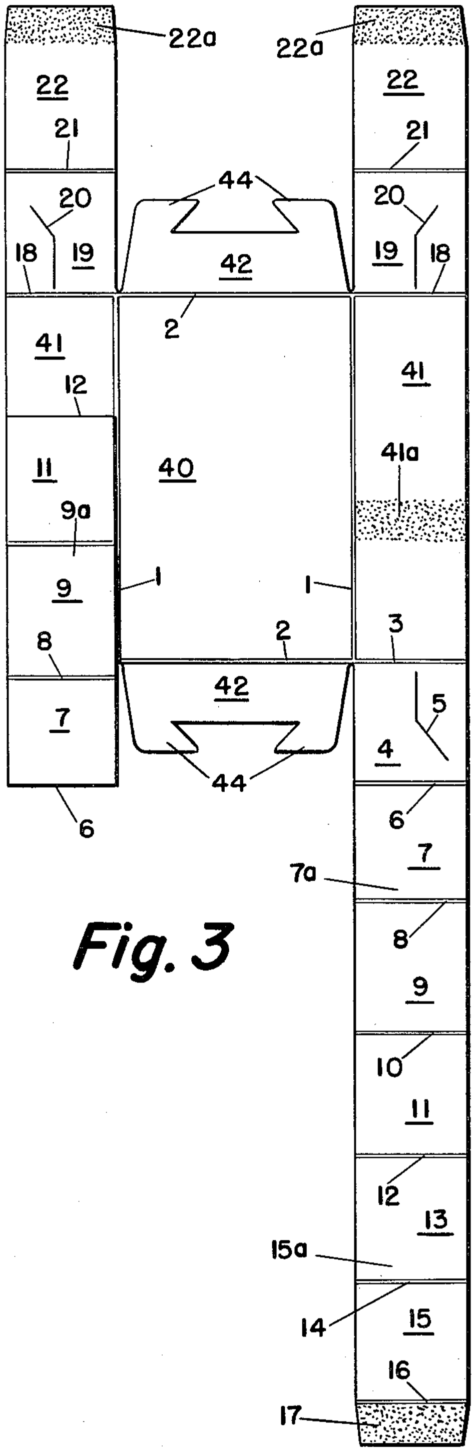
Figure 4:
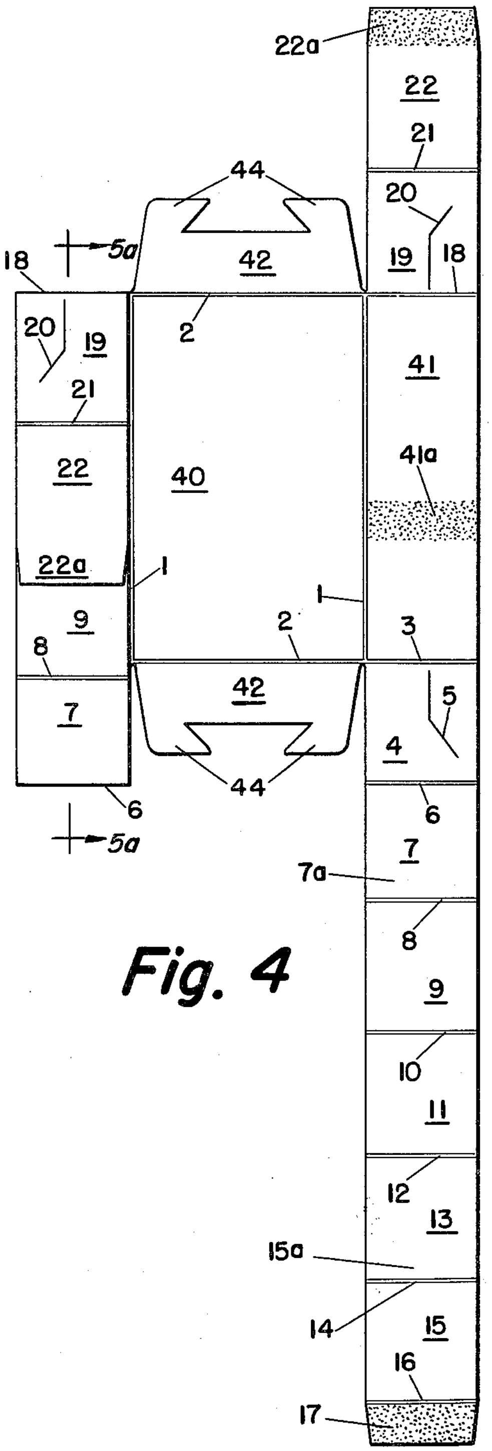
Figures 4A, 5:
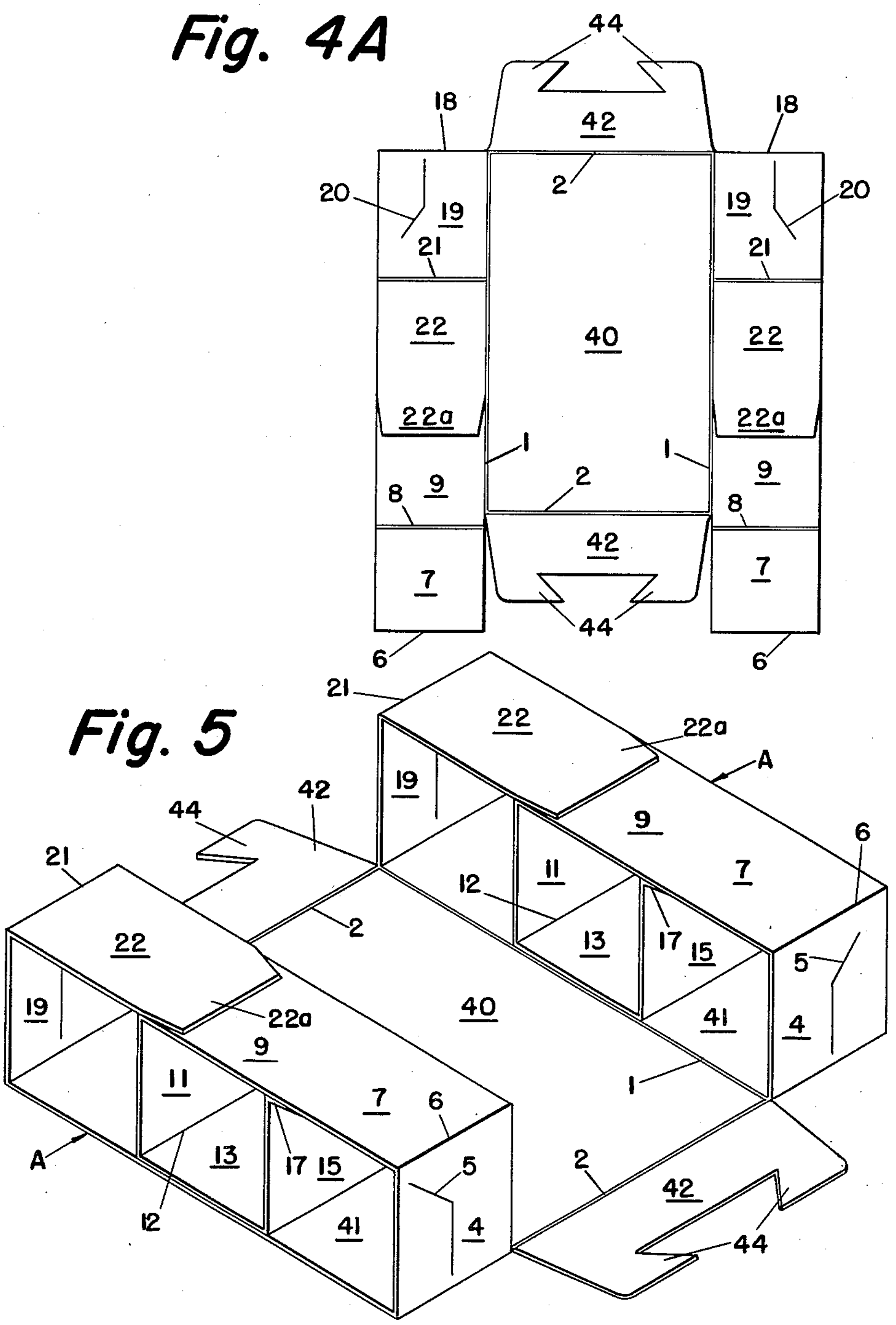
Figure 5A:
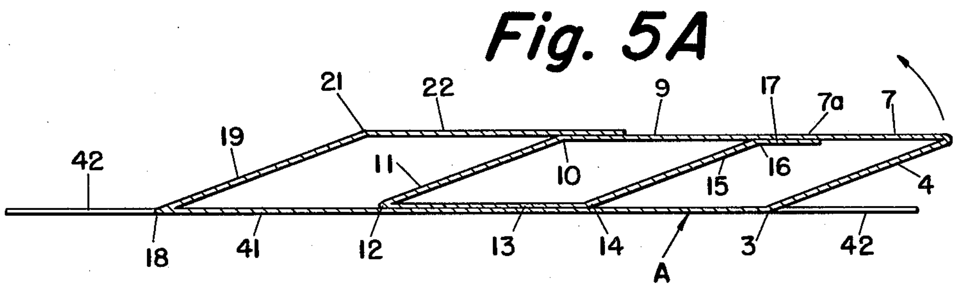
Figures 6, 7:
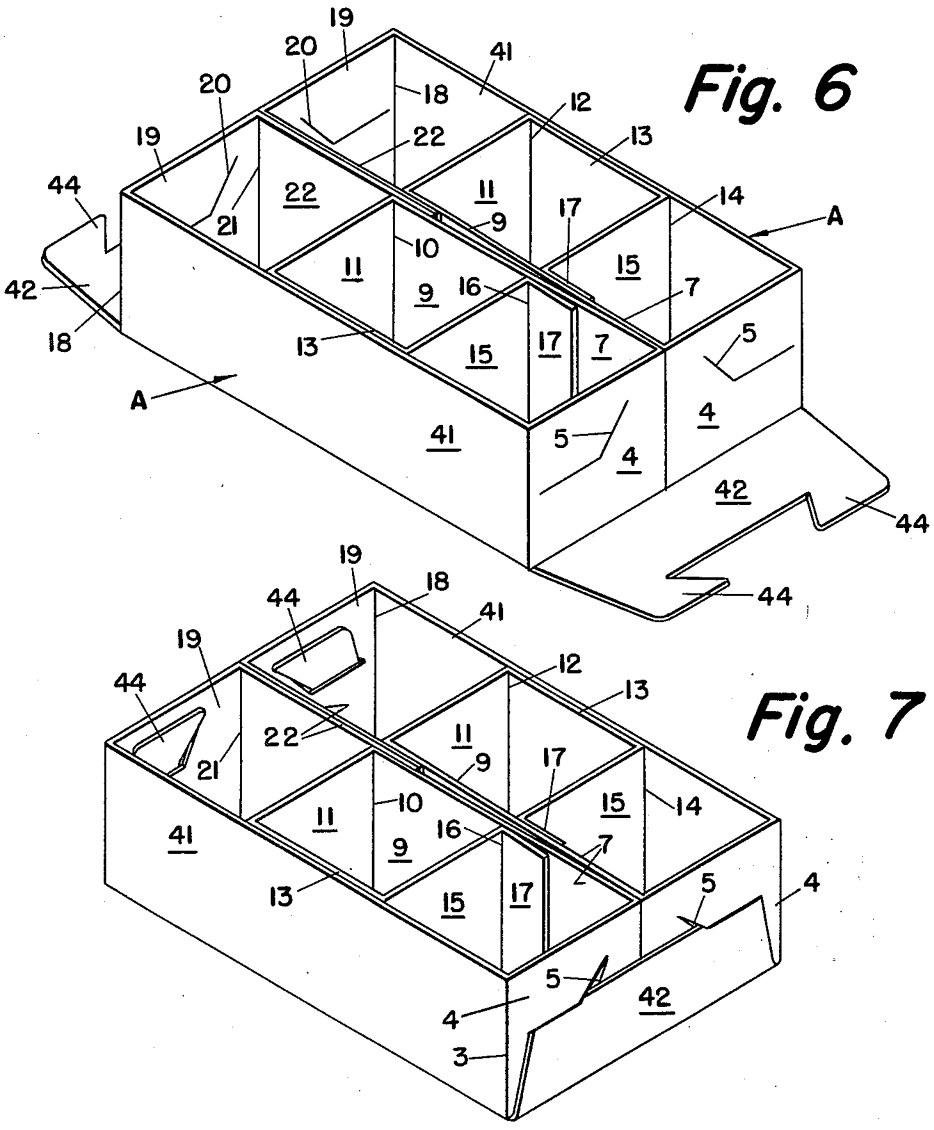
Figures 8, 9:
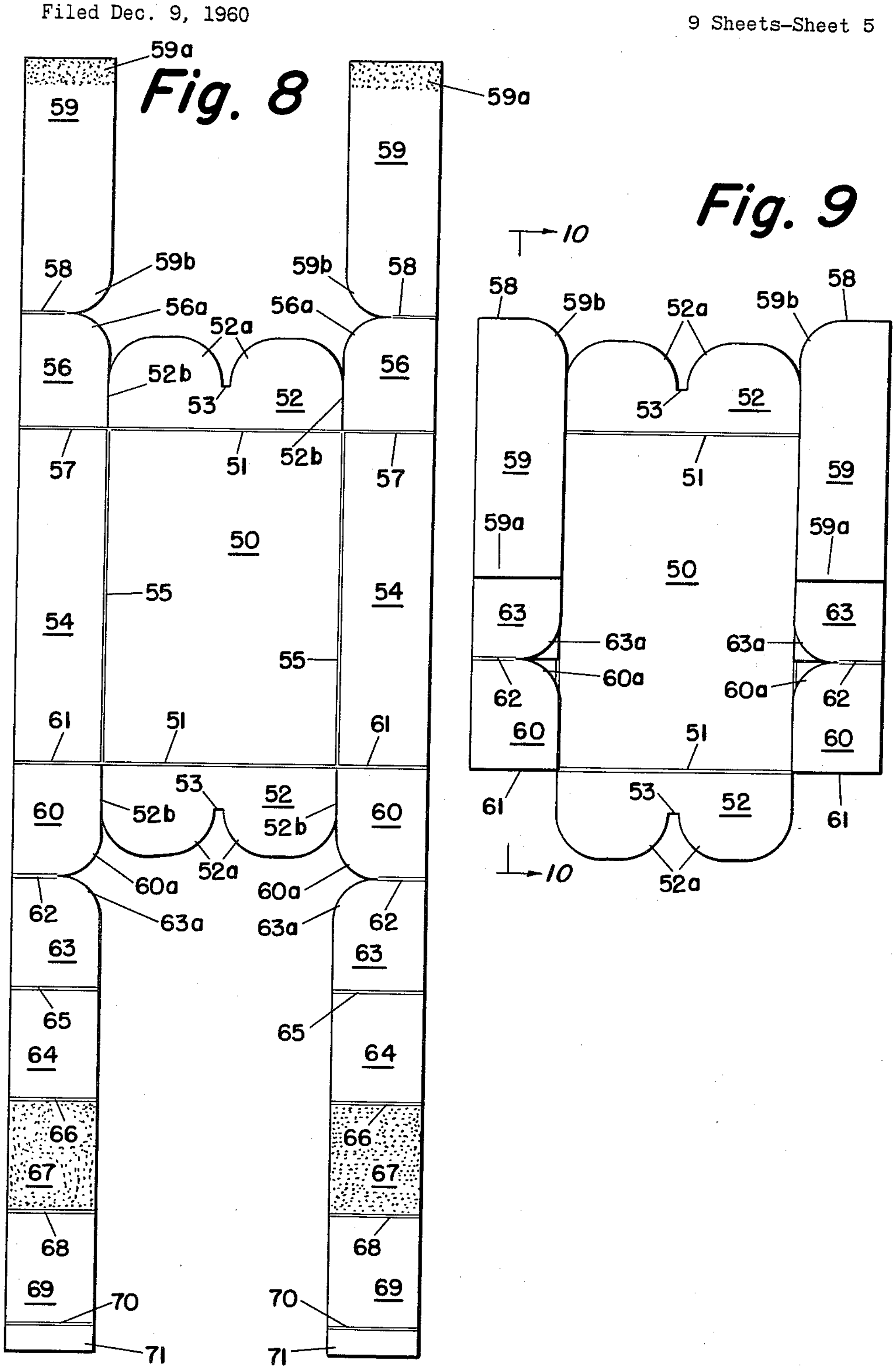
Figure 8A:
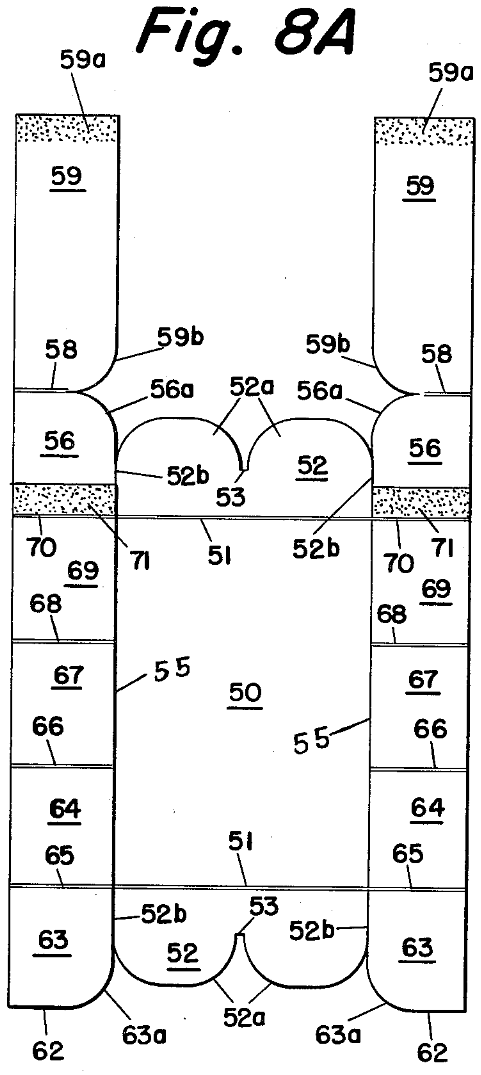
Figure 8B:
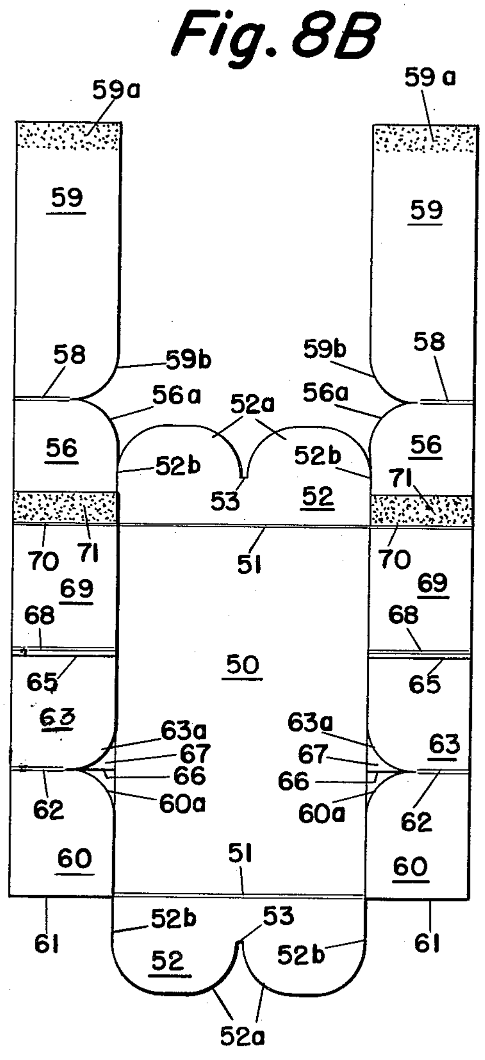
Figure 10:
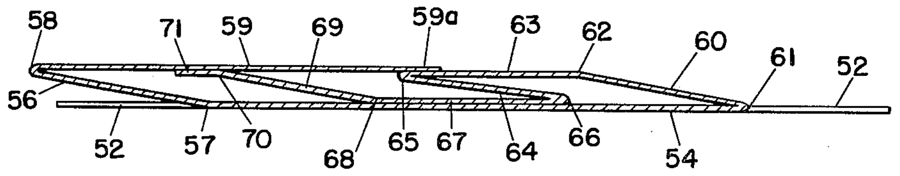
Figures 11, 12:
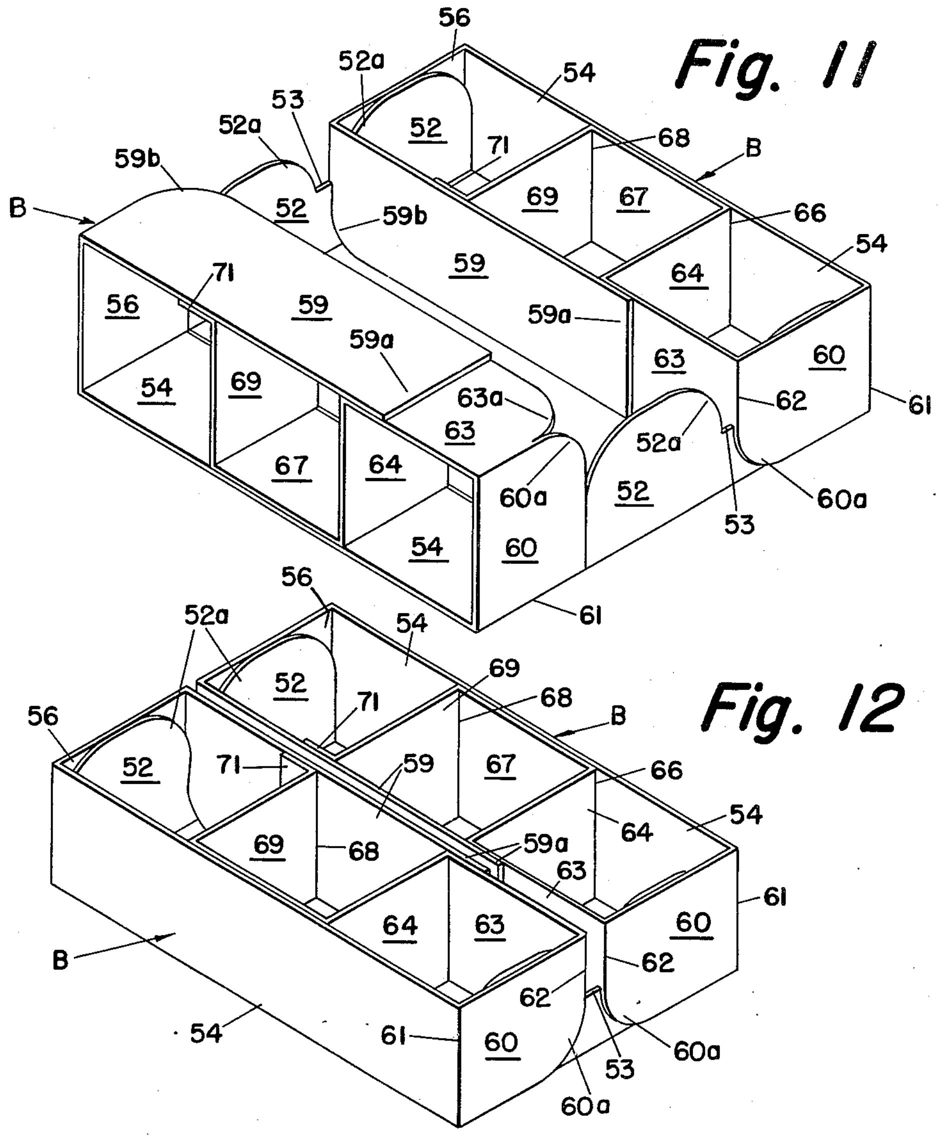
Figures 13, 14:
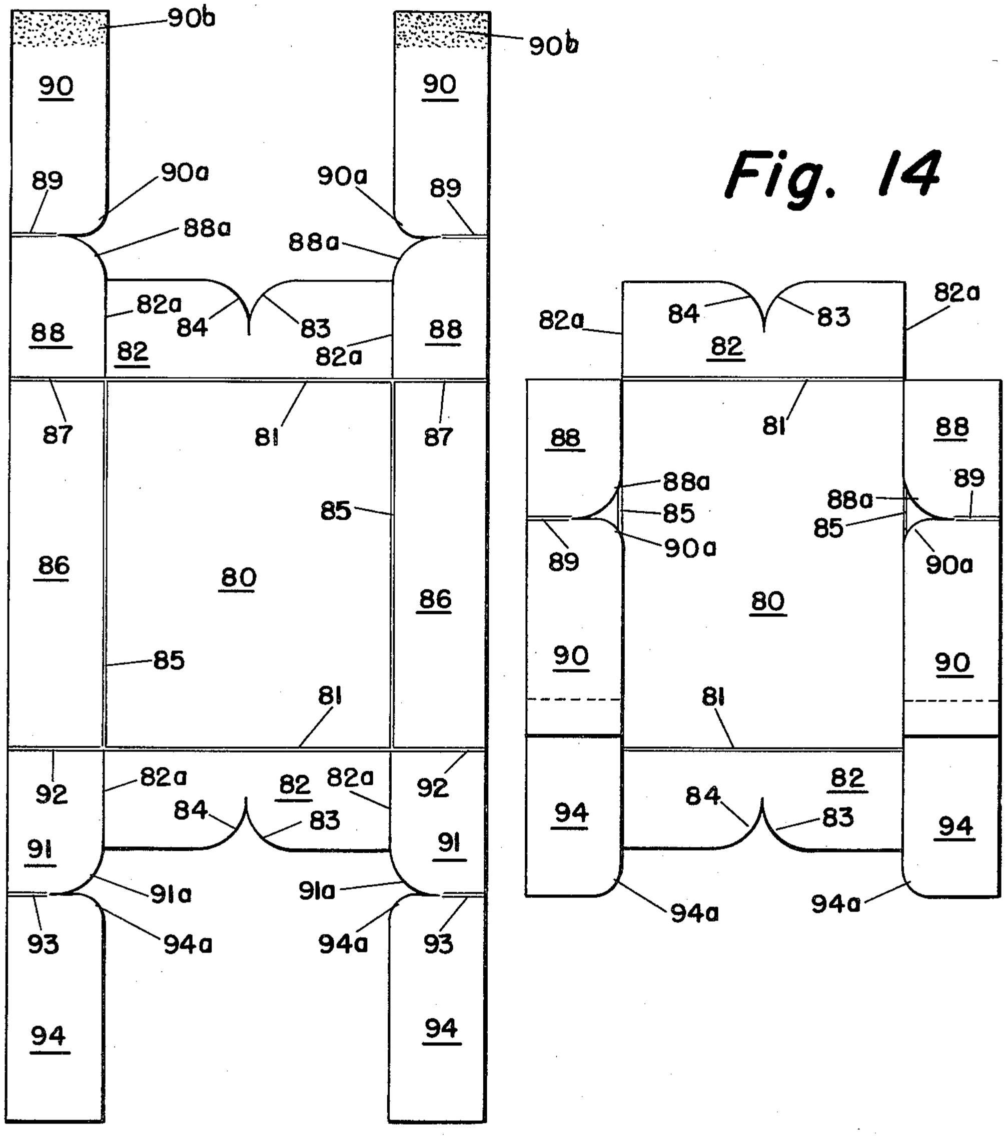
Figure 15:
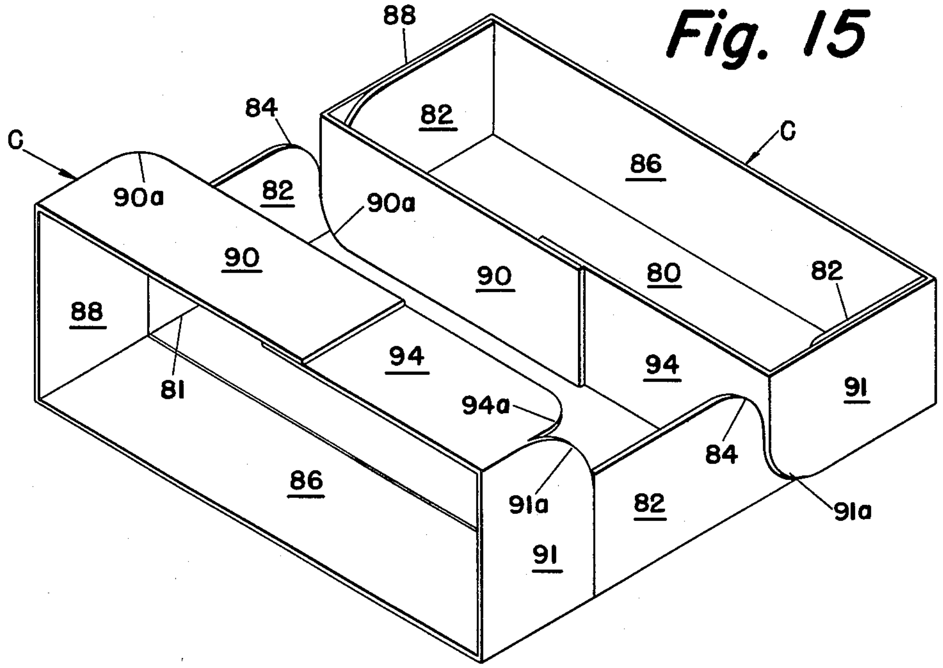
Figure 16:
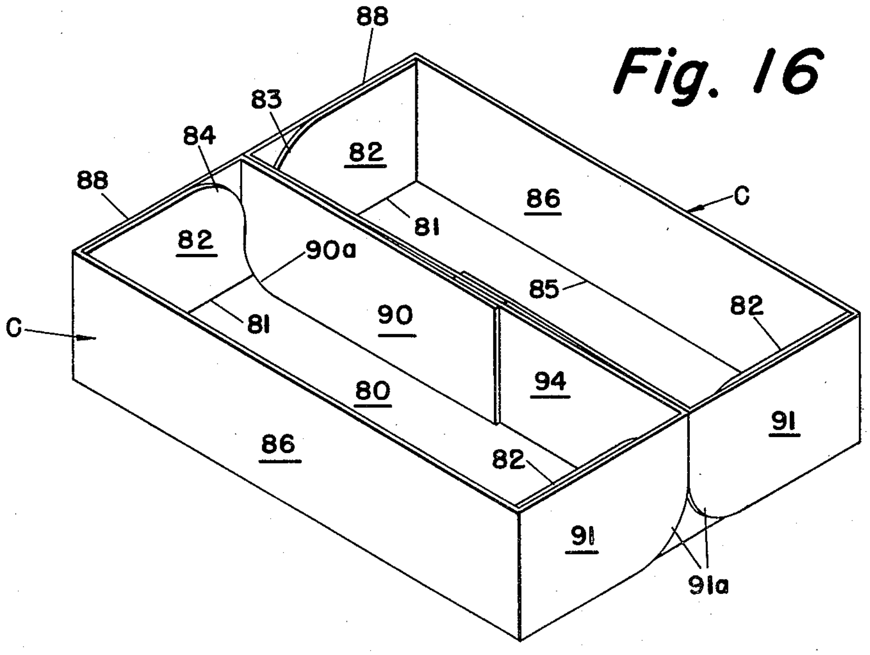

Further advantages and details of the invention will be apparent from the following description and accompanying drawings, wherein FIGURE 1 is a plan view of a blank for forming a tray according to the present invention, FIGURE 2 is a plan view of the blank shown in FIGURE 1 partially folded and glued, FIGURE 3 is a plan view of the same blank at a further stage of folding and glueing, FIGURE 4 is a plan view of the same blank at still a further stage of folding and glueing, FIGURE 4A shows the completed tray in folded flat condition, FIGURE 5 is a perspective view of the partially set up tray, FIGURE 5A is a sectional view taken on lines 5A—5A of FIGURE 4, FIGURE 6 is a perspective view of the tray partially set up, FIGURE 7 is a perspective view of the blank completely set up for use, FIGURE 8 is a plan view of another blank for making a modified tray construction, FIGURE 8A is a plan view of the blank shown in FIGURE 8 partially folded and glued, FIGURE 8B is a plan view of the blank shown in FIGURE 8A further folded and glued, FIGURE 9 is a plan view of the blank shown in FIGURE 8B finally folded and glued to form a tray, FIGURE 10 is a longitudinal sectional view taken on lines 10—10 of FIGURE 9 in partially set up condition, FIGURE 11 is a perspective view of the same partially set up tray, FIGURE 12 is a perspective view of the same completely set up tray, FIGURE 13 is a plan view of a third modified blank for forming a tray, FIGURE 14 is a plan view of the folded and glued blank shown in FIGURE 13, FIGURE 15 is a perspective view of the tray shown in FIGURE 14 partially set up, and FIGURE 16 is a perspective view of the same tray completely set up.

The tray is preferably made from a single flexible blank of suitable material, such as paper, cardboard, metal foil, cardboard lined with thin metal foil, or plastic sheet material. An exemplary tray construction is shown in FIGURES 1 to 7 wherein the blank, shown in FIGURE 1, is suitably cut and scored to provide a bottom wall 40 to which end flaps 42 are hinged respectively along score lines 2. Panels 41 are connected to bottom wall 40 along opposed score lines 1. A plurality of successive panels 4, 7, 9, 11, 13, 15 and 17 are connected to panels 41 and are hinged, respectively, along score lines 3, 6, 8, 10, 12, 14 and 16. Additional panels 19 and 22 are connected to the other ends of panels 41 and are hinged, respectively, along score lines 18 and 21. Panels 41 and the panels connected thereto after being suitably folded and adhered in a manner to be described later will provide a sleeve A (as indicated in FIGURE 5) hinged along score lines 1 to bottom wall 40. End flaps 42 are provided with locking tongue portions 44. Panels 4 and 19 are provided with slits 5 and 20, respectively, which are adapted to receive tongues 44 in locking relation.

In forming the tray from the blank previously described, adhesive is applied to a panel 17. A panel 13 is then folded over along hinge line 12 carrying with it as a unit connected panels 15 and 17 as shown in FIGURE 2, so as to adhere panel 17 to panel 7. Adhesive is then applied to the exposed portion 13*a* of panel 13. These combined panels are then folded over as a unit along hinge score line 6 so as to bring the adhesive coated area 13*a* into contact with the superposed area 41*a* of panel 41, as shown in FIGURE 3. Adhesive is then applied to the area 22*a* of panel 22 and combined panels 19 and 22 are then folded over as a unit along hinge score line 18 so as to bring adhesive coated area 22*a* of panel 22 into contact with area 9*a* of panel 9, as shown in FIGURE 4. The respective panels on the right hand side of the blank shown in FIGURE 1 are also folded and preferably adhered simultaneously in the same sequence as described previously for the left hand panels so as to complete the tray in final flat folded condition as shown in FIGURE 4A.

In using the tray it can be readily set up by simultaneously folding partition panels 4, 15, 11 and 19 in relation to panel 41, as shown in FIGURES 5 and 5A, thereby forming an open-ended integral endless sleeve designated generally by letter A, constituted of panel 41 and panels 4, 7, 9, 22, 19 and 41. The cross-partition panels 11 and 15 provide a plurality of aligned open-ended cells in the sleeve portion. The sleeves A are then folded over along score lines 1 and positioned with one open end thereof upon bottom wall 40, as shown in FIGURE 6. It will be noted noted that the panels 7, 9 and 22 of the two sleeves A will be brought into abutting contact and serve to reinforce the aligned cells. In order to achieve this relationship, panels 4, 15, 11 and 19 are of the same width and are approximately half the width of bottom wall 40. When the tray is fully set up as shown in FIGURE 7, the abutting panels 7, 9 and 22 will extend lengthwise along the median axis of the bottom wall 40. End flaps 42 are then folded up along hinge lines 2 and tongues 44 are inserted into the respective slits 20 provided in terminal partition panels 19 and in slits 5 of terminal partition panels 4. The set-up tray is now ready for use. Any suitable articles may be packaged in the cells. The tray construction is especially useful as a bakery tray if the blank is formed from a metal foil lined cardboard so that cakes or muffins may be baked and sold to the consumer in the same tray.

It will be apparent that modifications and changes may be made in the specific details of the tray construction. For example, the end flaps 42 may be adhered or stapled to the ends of the set-up collar portions. The dimensions of the walls and partitions may be varied. The number of partitions and cells may also be varied.

A modified tray construction is illustrated in FIGURES 8 to 12, wherein a blank of flexible sheet material such as cardboard is suitably cut and scored to provide a bottom wall 50 and sleeves hinged to opposed sides of the bottom wall along score lines 55. End locking flaps 52 are hinged along score line 51 to the bottom wall 50. End flaps 52 are provided with curvilinear tongues 52*a* separated from each other by a relatively short abutment portion 53 extending parallel to hinge line 51.

Open-ended integral endless sleeves B are formed by sleeve panel 54 hinged along score line 55 to the bottom wall 50. Partition panels 56 and 59 are connected to panel 54 along hinge lines 57 and 58, respectively. End flaps 52 are separated from panels 56 by cut score lines 52*b*. Panel 56 is provided with a curvilinear edge portion 56*a*. A complementally shaped curvilinear edge portion 59*b* is also provided in panel 59. A series of connected partition panels 60, 63, 64, 67, 69 and 71 are connected to the other end of panel 54 along hinge lines 61, 62, 65, 66, 68 and 70, respectively. Panel 60 is provided with a curvilinear edge portion 60*a* and panel 63 is provided with a complementally shaped curvilinear edge portion 63*a*. Panels 60 are separated from end flaps 52 by cut score lines 52*b*.

In forming the tray from the blank previously described, adhesive is applied to the exposed surface of panel 67 and the combined panels 63, 64, 67, 69 and 71 are folded over as a unit along score line 62, as shown in FIGURE 8A, thereby superposing panel 67 on panel 54 and thus adhering superposed panel 67 to medial portion of panel 54. Adhesive is then applied to the exposed surface portion 71 of panel 56 and adhesive is also applied to the exposed end portion 59*a* of panel 59. Hingedly connected panels 64, 63 and 60 are then swung upwardly about fold lines 61 and 66 so that panels 64 and 63 overlie panel 67, as shown in FIGURE 8B. Panel 59 is then folded over along score line 58 so as to superpose and adhere adhesive coated area 59*a* to the marginal portion of panel 63. At the same time adhesive coated panel 71 will adhere to the superposed median portion of panel 59, thereby producing the completed tray in flat folded condition, as shown in FIGURE 9.

In using this tray construction, the partition panels 60, 64, 69 and 56 are set up at right angles to panel 54 as shown in FIGURES 10 and 11. End flaps 52 are then folded at right angles to the bottom wall along their hinge lines 51, as shown in FIGURE 11. The set-up sleeves B are then folded inwardly along their respective hinge score lines 55 so as to embrace the free edges 52*a* of the end flaps 52. At the same time, the curvilinear edge portions 52*a* of the end flaps will pass between the spaces defined by curvilinear edges 56*a* and 59*b* of panels 56 and 59, respectively, into locking engagement. Likewise, the curvilinear portions 52*a* of the opposite end flaps 52 will pass between the spaces defined by curvilinear edges 60*a* and 63*a* of panels 60 and 63, respectively, into locking engagement. The set-up collar portions B and the partitions therein are thus firmly retained in locked condition and suitable articles can be positioned in the cells.

As best seen in FIGURE 12, the dimensions of the panels and flaps may be predetermined to provide a gap or passageway between the interior wall 59, 63 of one of sleeves B and the interior wall 59, 63 of the other sleeve B. This gap is particularly useful to facilitate evenness of baking when the tray is used as a bake-in tray, since the heated oven air may flow therethrough. Such a gap or passageway obviously may without difficulty be provided also in the embodiment previously described and in the embodiment to be described immediately following.

Another modification of the tray construction is illustrated in FIGURES 13 to 16, wherein the tray is formed from a single blank of flexible material which is suitably cut and scored to form a bottom wall 80, end flaps 82 hinged to the bottom wall 80 along hinge score line 81, and panel members 86 hinged to the bottom wall along hinge lines 85. Panel members 88 and 90 are connected to one end of panel 86 along hinge lines 87 and 89, respectively. Panel 88 is provided with a curvilinear cut-out edge 88*a*. Panel 90 is provided with a complemental curvilinear cut-out edge portion 90*a*. Panel members 91 and 94 are connected to the other end of panel 86 along hinge lines 92 and 93, respectively. Panel 91 is provided with a cut-out curvilinear edge portion 91*a*. Panel 94 is provided with a complemental curvilinear edge portion 94*a*. End flaps 82 are separated from panels 88 along cut score lines 82*a* at each side thereof.

In forming a tray from the described blank, adhesive is applied to the marginal area 90*b* of panels 90. Panel 94 is then folded over along hinge score line 93. Combined panels 88 and 90 are then folded over as a unit along hinge score line 87 so as to superpose and adhere the adhesive coated area 90*b* to the overlapped marginal portion of panel 94, as shown in FIGURE 14, thereby providing two open-ended integral endless sleeve portions C hinged to the bottom wall 80 along score lines 85, as shown in FIGURE 15.

In using the tray, panels 88 and 91 are folded up at right angles to panel 86 as shown in FIGURE 15. End locking panels 82 are then folded at right angles to the bottom wall 80, as shown in FIGURE 16. The two set-up sleeve portions C are then folded over the bottom wall and at the same time embrace the end flaps 82 so that the curved edge portions 83 and 84 are brought into locking engagement with curvilinear portions 88*a* and 90*a* of flaps 88 and 90, respectively, at one end of the collar portions C, and curved edge portions 83 and 84 of the other end flaps 82 are brought into locking engagement with curvilinear edges 91*a* and 94*a* of panels 91 and 94, whereby the collar portions C will be firmly retained in locked position wtih their lower free edges in contact with the bottom wall 80.

It will be apparent that many modifications may be made of the specific details of this invention shown in the three embodiments described herein which are intended to be included within the scope of the appended claim.

I claim:

A multi-compartment tray made from a single blank, comprising a bottom wall, side walls hinged to said bottom wall, end flaps hinged to said bottom wall, partition panels hinged to the ends of said side walls, said partition panels being adapted to be folded and adhered to form a plurality of aligned and endlessly connected open-ended cells, said cells having a width about half the width of said bottom wall, said partition panels being folded over and positioned with one open end thereof on said bottom wall, the cells adjacent each of said side walls being positioned in aligned relation, said end flaps being provided with locking means for retaining said partition members in upright open position on said bottom wall, the end partitions of the terminal cells being provided with slits for retaining said locking means of said end flaps.

References Cited in the file of this patent

UNITED STATES PATENTS

| | | |
|---|---|---|
| 1,014,081 | Miller | Jan. 9, 1912 |
| 2,700,499 | Durard | Jan. 25, 1955 |